(12) United States Patent
Adar et al.

(10) Patent No.: US 10,394,711 B2
(45) Date of Patent: Aug. 27, 2019

(54) MANAGING LOWEST POINT OF COHERENCY (LPC) MEMORY USING A SERVICE LAYER ADAPTER

(71) Applicant: International Business Machines Corporation, Armonk, NY (US)

(72) Inventors: Etai Adar, Yokneam Illit (IL); Lakshminarayana B. Arimilli, Austin, TX (US); Yiftach Benjamini, Givat Ela (IL); Bartholomew Blaner, Shelburne, VT (US); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 15/364,458

(22) Filed: Nov. 30, 2016

(65) Prior Publication Data
US 2018/0150396 A1    May 31, 2018

(51) Int. Cl.
*G06F 12/00* (2006.01)
*G06F 12/0815* (2016.01)
(Continued)

(52) U.S. Cl.
CPC ...... *G06F 12/0815* (2013.01); *G06F 12/1081* (2013.01); *G06F 13/1668* (2013.01);
(Continued)

(58) Field of Classification Search
CPC ............. G06F 12/0815; G06F 12/1081; G06F 12/145; G06F 13/1668; G06F 2212/1024;
(Continued)

(56) References Cited

U.S. PATENT DOCUMENTS 5,577,220 A * 11/1996 Combs ................. G06F 9/4418
                                                                711/206
5,590,302 A * 12/1996 Tanaka ................ G06F 12/0292
                                                                711/206

(Continued)

OTHER PUBLICATIONS

IBM, *Coherent Accelerator Processor Interface User's Manual*, Advance, Version 1.2, <http://www.nallatech.com/wp-content/uploads/IBM_CAPI_Users_Guide_1-2.pdf> (online), dated Jan. 29, 2015, 101 pages.

(Continued)

*Primary Examiner* — Prasith Thammavong
(74) *Attorney, Agent, or Firm* — Nathan M. Rau

(57) ABSTRACT

Managing lowest point of coherency (LPC) memory using a service layer adapter, the adapter coupled to a processor and an accelerator on a host computing system, the processor configured for symmetric multi-processing, including receiving, by the adapter, a memory access instruction from the accelerator; retrieving, by the adapter, a real address for the memory access instruction; determining, using base address registers on the adapter, that the real address targets the LPC memory, wherein the base address registers direct memory access requests between the LPC memory and other memory locations on the host computing system; and sending, by the adapter, the memory access instruction and the real address to a media controller for the LPC memory, wherein the media controller for the LPC memory is attached to the adapter via a memory interface.

20 Claims, 6 Drawing Sheets

(51) Int. Cl.
*G06F 12/1081* (2016.01)
*G06F 13/16* (2006.01)
*G06F 12/14* (2006.01)

(52) U.S. Cl.
CPC .... *G06F 12/145* (2013.01); *G06F 2212/1024* (2013.01); *G06F 2212/1052* (2013.01); *G06F 2212/621* (2013.01); *G06F 2212/656* (2013.01)

(58) Field of Classification Search
CPC ....... G06F 2212/1052; G06F 2212/621; G06F 2212/656
See application file for complete search history.

(56) References Cited

U.S. PATENT DOCUMENTS

| | | | | |
|---|---|---|---|---|
| 5,914,730 | A * | 6/1999 | Santos | G06F 3/14 345/503 |
| 5,933,158 | A * | 8/1999 | Santos | G06F 3/14 345/501 |
| 5,936,640 | A * | 8/1999 | Horan | G06F 3/14 345/520 |
| 6,405,289 | B1 | 6/2002 | Arimilli et al. | |
| 6,986,052 | B1 * | 1/2006 | Mittal | G06F 12/1441 713/190 |
| 8,966,315 | B2 * | 2/2015 | Burn | G06F 11/1446 711/173 |
| 9,842,075 | B1 * | 12/2017 | Davis | G06F 13/385 |
| 2002/0093507 | A1 * | 7/2002 | Olarig | G06F 12/1081 345/568 |
| 2006/0020719 | A1 * | 1/2006 | Martinez | G06F 12/1081 710/22 |
| 2006/0069899 | A1 * | 3/2006 | Schoinas | G06F 12/1081 711/206 |
| 2006/0075285 | A1 * | 4/2006 | Madukkarumukumana | G06F 11/0712 714/5.11 |
| 2006/0080078 | A1 | 4/2006 | Wang et al. | |
| 2006/0168365 | A1 * | 7/2006 | Martinez | G06F 12/1081 710/22 |
| 2006/0288130 | A1 * | 12/2006 | Madukkarumukumana | G06F 12/1081 710/22 |
| 2008/0294825 | A1 * | 11/2008 | Mahalingam | G06F 9/4812 710/262 |
| 2009/0193199 | A1 * | 7/2009 | Averill | G06F 12/0817 711/144 |
| 2010/0257317 | A1 * | 10/2010 | Arimilli | G06F 12/0811 711/122 |
| 2011/0145447 | A1 | 6/2011 | Dimond | |
| 2013/0097405 | A1 * | 4/2013 | Thorvaldsson | G06F 12/02 711/216 |
| 2014/0101403 | A1 | 4/2014 | Martin | |
| 2015/0317274 | A1 | 11/2015 | Arroyo et al. | |
| 2016/0098358 | A1 * | 4/2016 | Cha | G06F 12/1081 710/313 |
| 2016/0217101 | A1 | 7/2016 | Johns et al. | |
| 2016/0291887 | A1 * | 10/2016 | Gole | G06F 3/064 |
| 2018/0150396 | A1 * | 5/2018 | Adar | G06F 13/1668 |

OTHER PUBLICATIONS

Funk, *Addressing Is the Secret of Power8 Capi*, <http://www.nextplatform.com/2015/06/22/the-secret-of-power8-capi-is-addressing> (online), dated Jun. 22, 2015, 11 pages.

IBM, *Power8 Coherent Accelerator Processor Interface* (CAPI), <http://www-304.ibm.com/support/customercare/sas/f/capi/home.html> (online), printed Sep. 19, 2016, 2 pages.

International Search Report and Written Opinion of the ISA dated Mar. 7, 2018—International Application No. PCT/IB2017/057408.

* cited by examiner

MANAGING LOWEST POINT OF COHERENCY (LPC) MEMORY USING A SERVICE LAYER ADAPTER

BACKGROUND

Field of the Invention

The field of the invention is data processing, or, more specifically, methods, apparatus, and products for managing lowest point of coherency (LPC) memory using a service layer adapter.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing lowest point of coherency (LPC) memory using a service layer adapter are disclosed in this specification. Managing lowest point of coherency (LPC) memory using a service layer adapter, the adapter coupled to a processor and an accelerator on a host computing system, the processor configured for symmetric multi-processing, includes receiving, by the adapter, a memory access instruction from the accelerator; retrieving, by the adapter, a real address for the memory access instruction; determining, using base address registers on the adapter, that the real address targets the LPC memory, wherein the base address registers direct memory access requests between the LPC memory and other memory locations on the host computing system; and sending, by the adapter, the memory access instruction and the real address to a media controller for the LPC memory, wherein the media controller for the LPC memory is attached to the adapter via a memory interface.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
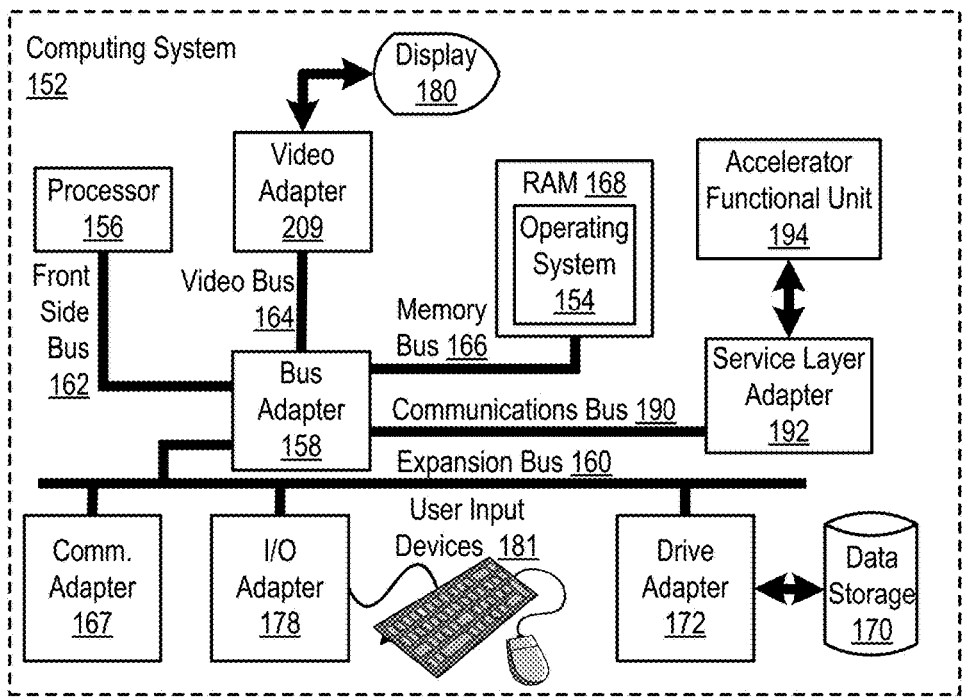
FIG. 1 sets forth a block diagram of an example system configured for managing lowest point of coherency (LPC) memory using a service layer adapter according to embodiments of the present invention.

Exemplary methods, apparatus, and products for managing lowest point of coherency (LPC) memory using a service layer adapter in accordance with the present invention are described with reference to the accompanying drawings, beginning with FIG. 1. FIG. 1 sets forth a block diagram of automated computing machinery comprising an exemplary computing system (152) configured for managing lowest point of coherency (LPC) memory using a service layer adapter according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for managing lowest point of coherency (LPC) memory using a service layer adapter according to embodiments of the present invention include UNIX™, Linux™, Microsoft XP™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for managing lowest point of coherency (LPC) memory using a service layer adapter according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing lowest point of coherency (LPC) memory using a service layer adapter according to embodiments of the present invention include modems for wired dial-up communications, Ethernet (IEEE 802.3) adapters for wired data communications, and 802.11 adapters for wireless data communications.

The exemplary computing system (152) of FIG. 1 includes a communications bus (190) that connects the processor and RAM (168) (via the bus adapter (158)) to the service layer adapter (192) and the accelerator functional unit (194).

Figure 2:
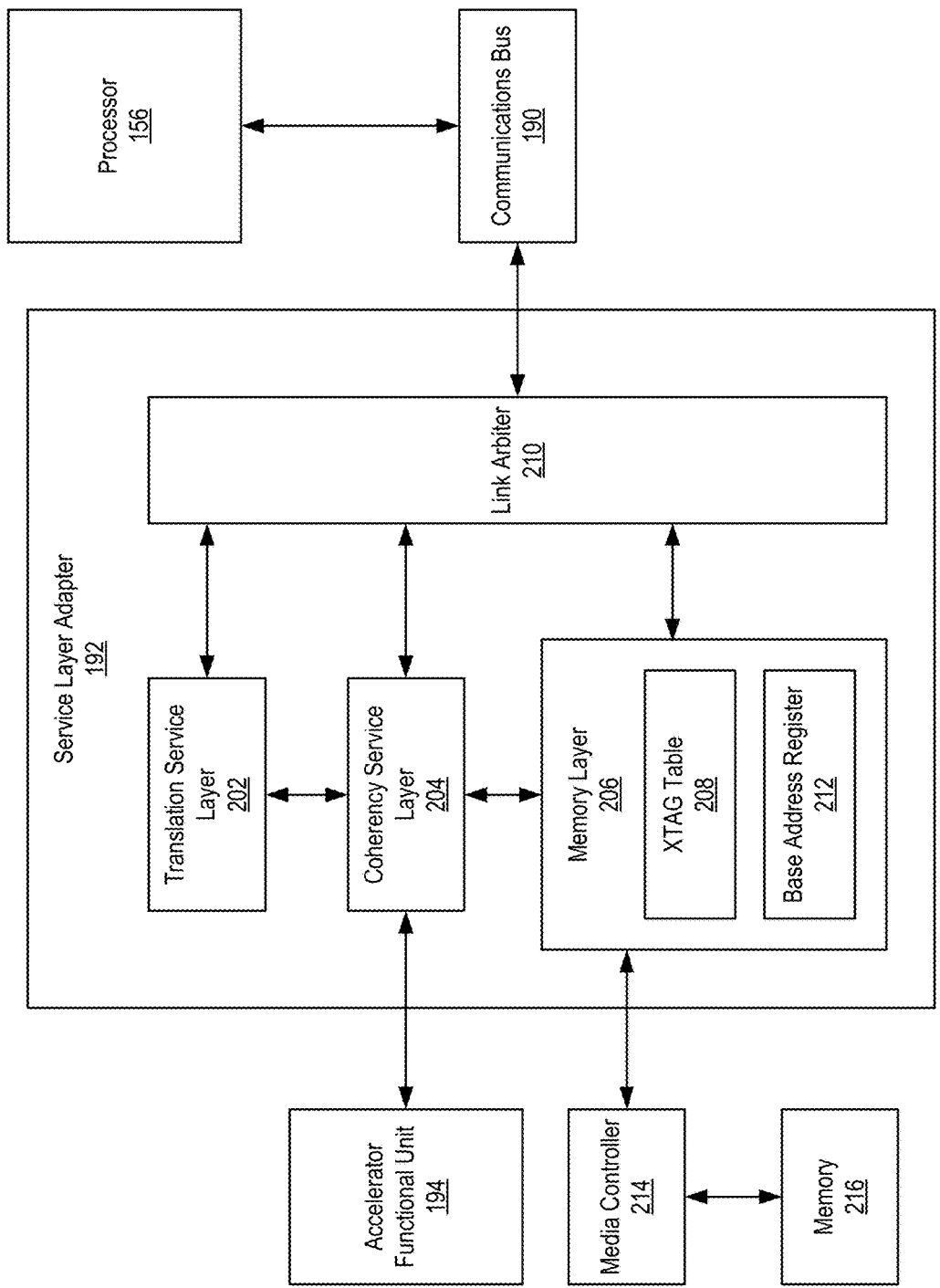
FIG. 2 sets forth a block diagram for managing LPC memory using a service layer adapter according to embodiments of the present invention.

FIG. 2 is an example block diagram of a system configured for managing lowest point of coherency (LPC) memory using a service layer adapter. FIG. 2 includes the accelerator functional unit (194), memory (216) a media controller (214), the service layer adapter (192), a communications bus (190), and a processor (156). The service layer adapter (192) includes a translation service layer (202), a coherency service layer (204), a memory layer (206), and a link arbiter (210). The memory layer (206) includes an XTAG table (208) and a base address register (212).

The accelerator functional unit (AFU) (194) is an accelerator configured to extend the functionality of the computing system. The AFU (194) may be a removable component of the computing system installed to perform a specific task or group of tasks. Example AFUs (194) include, for example, network interface cards, graphics accelerator cards, and storage adapter cards.

The communications bus (190) is a medium through which data is moved between hardware components on the computing system. The communications bus (190) may include a bus controller that manages data transmitted on the communications bus (190). Example communications buses (190) include peripheral component interconnect express (PCIe) buses.

The AFU (194) may be configured to send coherency-based operations and memory access instructions to other hardware elements on the computing system via the communications bus. The processor (156) may include a coherent accelerator processor proxy that provides, to the AFU (194), access to the coherent symmetric multiprocessing bus on the processor (156). The proxy may be used by a coherent accelerator proxy interface that allows the AFU (194) to participate in symmetric multiprocessing coherency protocols.

The service layer adapter (192) adapts the communications between the AFU (194) and the coherent accelerator proxy interface. Communication between the service layer adapter (192) and the proxy is encapsulated into packets over the communications bus to the processor. The service layer adapter (192) may be implemented on an external chip, such as a field programmable gate array or application specific integrated circuit.

The service layer adapter (192) may be configured to service coherency-based operations initiated by the AFU (194). The service layer adapter (192) includes a translation service layer (202), a coherency service layer (204), and a memory layer (206). The translation service layer (202) may include elements and logic for retrieving a context for an operation and translating effective addresses to real addresses using an effective-to-real address translation (ERAT). The effective address is an address used by elements and processes in the computing system to refer to memory locations. However, the effective address must be translated into a real address in order to access the requested data. Effective addresses may be referred as virtual addresses, and real addresses may be referred to as physical addresses. The translation service layer (202) may also include a context cache to store frequently accessed contexts and an ERAT cache to store frequently accessed real address translations.

The coherency service layer (204) may include elements and logic to carry out coherency-based operations. The coherency service layer (204) receives context-based communications from the AFU (194) (via a coherency interface) and communicates with the other layers in the service layer adapter (192) to service the operations. The coherency service layer (204) may also include a data cache to store data frequently targeted by coherency-based operations. The coherency service layer (204) also handles other tasks related to maintaining data coherency between the AFU (194) and other memory locations on the computing system.

The service layer adapter (192) also provides a memory interface to a media controller (214) and memory (216) via a memory layer (206). The memory layer (206) provides access to the memory (216) and media controller (214) and manages access to the memory (216) as lowest point of coherency (LPC) memory. Managing the memory (216) as LPC memory may include providing memory management unit-type services for the memory, such as snooping to maintain coherency of the memory (216) as well as directing memory access requests between the LPC memory (216) and memory located elsewhere on the system.

The memory layer (206) may provide, to the AFU (194), access to the memory (216). Accessing the memory (216) attached to the service layer adapter (192) may have lower latency than accessing memory elsewhere on the system. Further, the memory (216) may be assigned, in part or in whole, to other elements on the system that require or benefit from a larger amount of memory. For example, the processor (156) may be utilized for activities that require a large amount of memory. The memory may be provided via the memory interface on the service layer adapter (192) at a lower cost or as part of an upgrade to the system.

Further, the memory (216) may be partitioned between the AFU (194) and other elements on the system, such as the processor (158). Doing so provides the AFU (194) with low-latency access to memory while bolstering the memory reserves of the processor (158) or other elements requiring additional memory. The memory may be volatile memory distinct from the RAM and distinct from other memory managed by the processor and memory management unit.

The memory layer (206) also includes a base address register (212). The base address register (212) provides a base address from which a memory mapping begins. The base address register (212) may functionally direct memory addresses within memory access instructions to different memory locations on the system, including memory (216), memory on the processor (156), and memory coupled to other service layer adapters on the host system.

The memory layer (206) communicates with a media controller (214) via a memory interface. The media controller (214) is a device configured to facilitate communication between the memory layer (206) of the service layer adapter (192) and the memory (216). The media controller (214) may be unique to the type of memory (216) device attached thereto.

The media controller (214) may communicate with the memory layer (206) over a memory interface. The memory interface on the memory layer (206) may be a distinct communication interface from the coherency interface on the coherency service layer (204). For example, the coherency interface and the memory interface may be separate pins on the chip that the service layer adapter (192) is implemented upon. Further, the service layer adapter (192) may include multiple ports exposed to the AFU (194). The exposed ports may be used by the AFU (194) to distribute memory access instructions according to the AFU (194) requirements.

The memory layer (206) provides translation services using translation tags (XTAGs). XTAGs are provided to the AFU (194) and stored in the XTAG table (208) mapped to a real address. The XTAG table (208) maps XTAGs to internal addresses, such as real addresses, used by the processor (156) and memory layer (206). An XTAG is used by the AFU (194) to identify memory locations within memory access instructions. The AFU (194) may have no access to or knowledge of real addresses used by the processor (156) or other device on the computing system. Although the XTAG table (208) is shown within the memory layer (206), the XTAG table (208) may reside anywhere on the service layer adapter (192) or accessible by the service layer adapter (192).

The AFU (194) may be allocated memory from the memory (216) or elsewhere on the system, such as memory on the processor (158) or other memory managed by the memory management unit. The AFU (194) may not be aware of the physical location of the memory accessible via the service layer adapter (192). In other words, the AFU (194) will access all allocated memory via the service layer adapter (192) using the same instruction set regardless of the location of the memory. The memory attached to the service layer adapter (192) may, however, provide lower latency access than memory elsewhere on the system.

The link arbiter (210) provides a translation layer to facilitate communication between the service layer adapter (192) and other hardware elements on the computing system, such as the processors. The link arbiter (210) may also provide an interface to update different caches (e.g., context cache, ERAT cache) on the service layer adapter (192) in the event of a cache miss.

Figure 3:
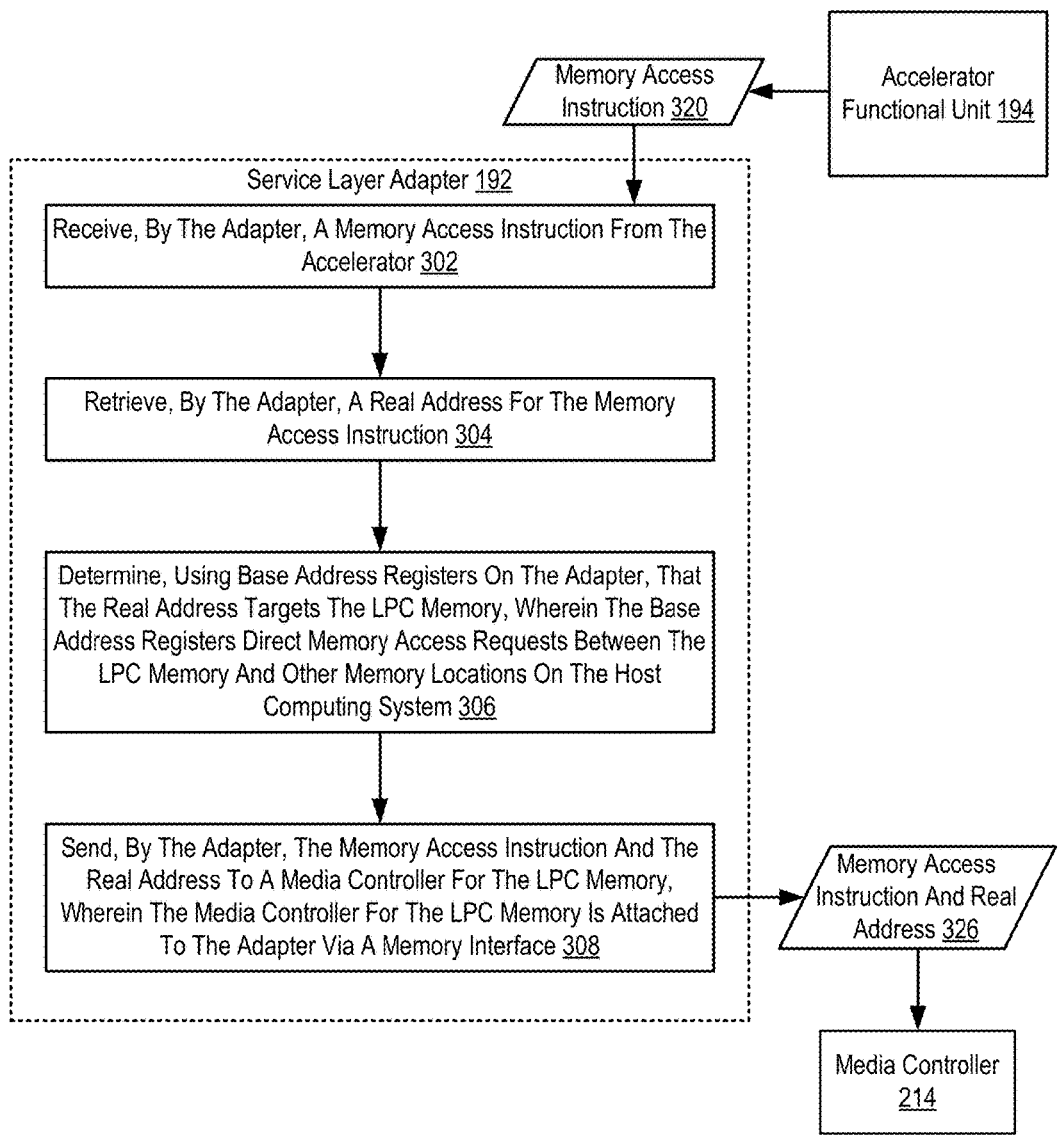
FIG. 3 sets forth a flow chart illustrating an exemplary method for managing LPC memory using a service layer adapter according to embodiments of the present invention.

For further explanation, FIG. 3 sets forth a flow chart illustrating an exemplary method for managing lowest point of coherency (LPC) memory using a service layer adapter according to embodiments of the present invention. The method of FIG. 3 includes receiving (302), by the adapter (192), a memory access instruction (320) from the accelerator (194). Receiving (302), by the adapter (192), a memory access instruction (320) from the accelerator (194) may be carried out by receiving, by the adapter (192) from the accelerator (194), a request to initiate a memory access operation comprising an effective address; translating the effective address to the real address; providing, by the adapter (192) to the accelerator (194), a translation tag ('XTAG') corresponding to the real address; and receiving, by the adapter (192) from the accelerator (194), the memory access instruction comprising the XTAG.

The memory access instruction may be received by the adapter via the coherency interface on the adapter. Alternatively, the memory access instruction may be received by another interface coupling the accelerator (194) and the adapter (192). For example, the adapter (192) may provide specialized interfaces for memory access instructions, such as a direct memory access interface.

The method of FIG. 3 also includes retrieving (304), by the adapter (192), a real address for the memory access instruction. Retrieving (304), by the adapter (192), a real address for the memory access instruction may be carried out by obtaining, from an XTAG table, the real address mapped to the XTAG and replacing, by the adapter, the XTAG in the memory access instruction with the real address. The real address may be derived from the memory access instruction algorithmically. For example, the adapter (192) may apply an algorithm to elements of the memory access instruction, such as an XTAG, to obtain the real address.

Retrieving (304), by the adapter (192), a real address for the memory access instruction may also be carried out by determining that the adapter (194) is authorized to access the targeted location in memory. For example, the ERAT or other structure may indicate whether the accelerator (194) or the associated context has permission to access the memory identified by the effective address or the associated real address.

The method of FIG. 3 also includes determining (306), using base address registers on the adapter (192), that the real address targets the LPC memory, wherein the base address registers direct memory access requests between the LPC memory and other memory locations on the host computing system. Determining (306), using base address registers on the adapter (192), that the real address targets the LPC memory, wherein the base address registers direct memory access requests between the LPC memory and other memory locations on the host computing system may be carried out by determining a base address for the real address and using the combined base address and real address to determine the location on the system that the memory for the real address resides. The location may be the memory attached to the media controller (214), memory on the processor, memory controlled by the memory management unit (such as system RAM), or memory attached to another service layer adapter on the system.

The method of FIG. 3 also includes sending (308), by the adapter (192), the memory access instruction and the real address (326) to a media controller (214) for the LPC memory, wherein the media controller (214) for the LPC memory is attached to the adapter (192) via a memory interface. Sending (308), by the adapter (192), the memory access instruction and the real address (326) to a media controller (214) for the LPC memory, wherein the media controller (214) for the LPC memory is attached to the adapter (192) via a memory interface may be carried out by placing the memory access instruction and real address (326) on the memory interface attached to the media controller (214). Sending (308), by the adapter (192), the memory access instruction and the real address (326) to a media controller (214) for the LPC memory, wherein the media controller (214) for the LPC memory is attached to the adapter (192) via a memory interface may also be carried out by the media controller (214) translating the memory access instruction into lower-level instructions suitable for servicing the memory access instruction by the attached memory.

Figure 4:
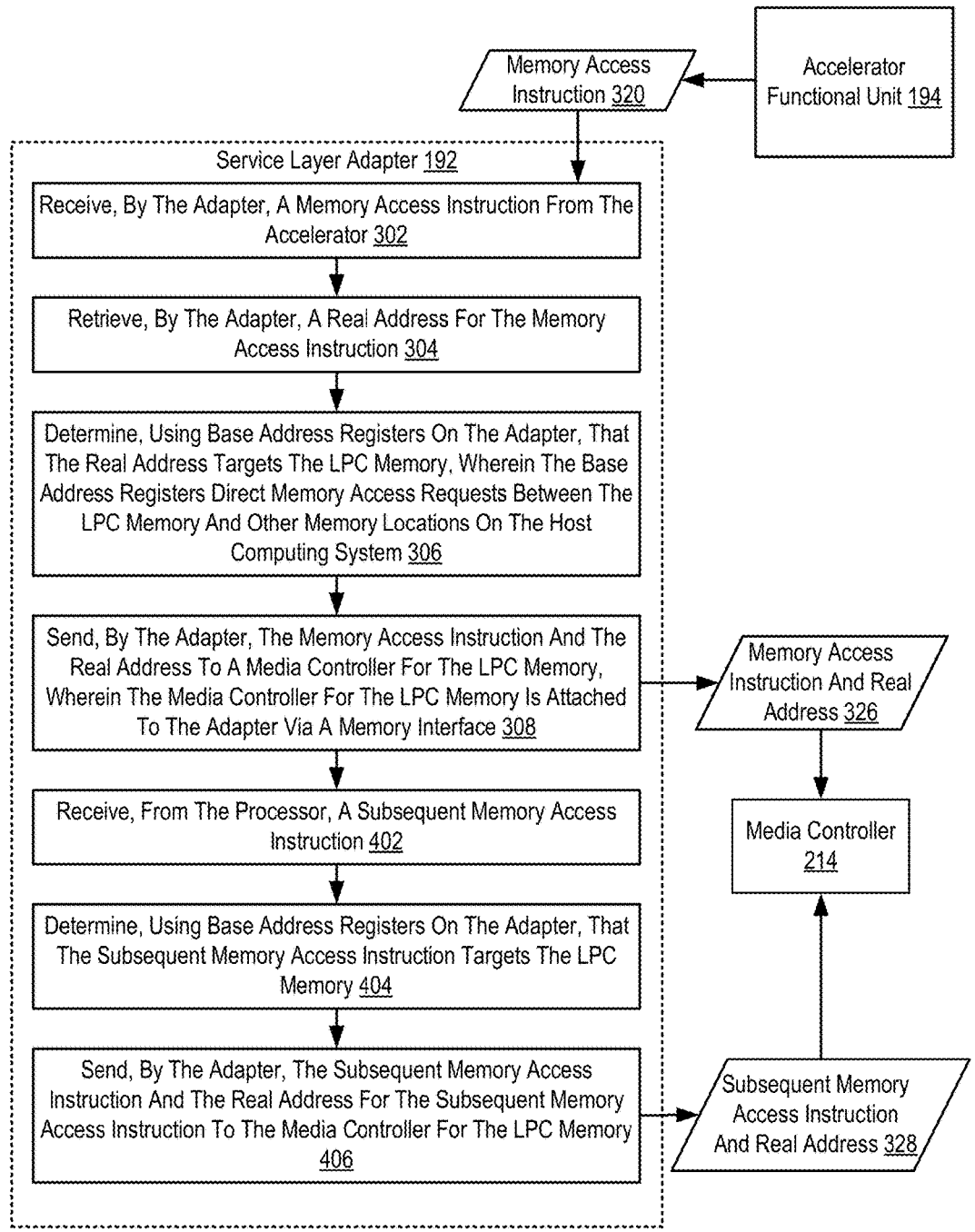
FIG. 4 sets forth a flow chart illustrating an exemplary method for managing LPC memory using a service layer adapter according to embodiments of the present invention.

For further explanation, FIG. 4 sets forth a flow chart illustrating an exemplary method for managing lowest point of coherency (LPC) memory using a service layer adapter according to embodiments of the present invention that includes receiving (302), by the adapter (192), a memory access instruction (320) from the accelerator (194); retrieving (304), by the adapter (192), a real address for the memory access instruction; determining (306), using base address registers on the adapter (192), that the real address targets the LPC memory, wherein the base address registers direct memory access requests between the LPC memory and other memory locations on the host computing system; and sending (308), by the adapter (192), the memory access instruction and the real address (326) to a media controller (214) for the LPC memory, wherein the media controller (214) for the LPC memory is attached to the adapter (192) via a memory interface.

The method of FIG. 4 differs from the method of FIG. 3, however, in that FIG. 4 further includes receiving (402), from the processor, a subsequent memory access instruction. Receiving (402), from the processor, a subsequent memory access instruction may be carried out by a core or other element on the processor generating a subsequent memory access instruction with a real address targeting a memory location on the memory attached to the service layer adapter (192). The memory access instruction may be directed, via a base address register on the processor, to the service layer adapter (192).

The method of FIG. 4 further includes determining (404), using base address registers on the adapter, that the subsequent memory access instruction targets the LPC memory. Determining (404), using base address registers on the adapter, that the subsequent memory access instruction targets the LPC memory may be carried out by determining a base address for the real address and using the combined base address and real address to determine that the subsequent memory access request targets a location on the memory attached to the adapter (192).

The method of FIG. 4 further includes sending (406), by the adapter (192), the subsequent memory access instruction and the real address for the subsequent memory access instruction (328) to the media controller (214) for the LPC memory. Sending (406), by the adapter (192), the subsequent memory access instruction and the real address for the subsequent memory access instruction (328) to the media controller (214) for the LPC memory may be carried out by placing the subsequent memory access instruction and real address (328) on the memory interface attached to the media controller (214). The subsequent memory access instruction may target a portion of the same memory attached the adapter (192) accessed by the accelerator, although the processor and accelerator (194) may be restricted to locations on the memory for which they are permitted to access.

Figure 5:
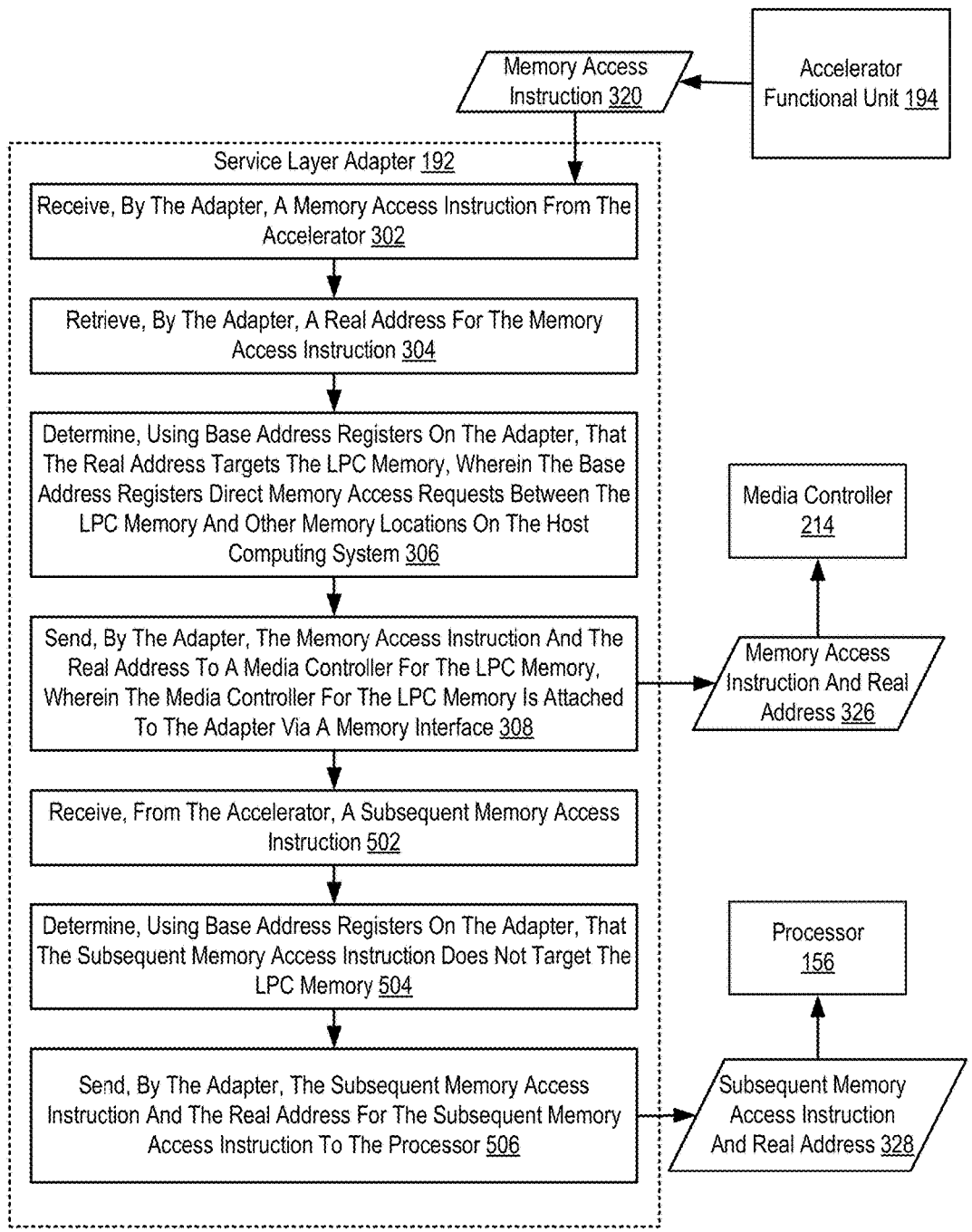
FIG. 5 sets forth a flow chart illustrating an exemplary method for managing LPC memory using a service layer adapter according to embodiments of the present invention.

For further explanation, FIG. 5 sets forth a flow chart illustrating an exemplary method for managing lowest point of coherency (LPC) memory using a service layer adapter according to embodiments of the present invention that includes receiving (302), by the adapter (192), a memory access instruction (320) from the accelerator (194); retrieving (304), by the adapter (192), a real address for the memory access instruction; determining (306), using base address registers on the adapter (192), that the real address targets the LPC memory, wherein the base address registers direct memory access requests between the LPC memory and other memory locations on the host computing system; and sending (308), by the adapter (192), the memory access instruction and the real address (326) to a media controller (214) for the LPC memory, wherein the media controller (214) for the LPC memory is attached to the adapter (192) via a memory interface.

The method of FIG. 5 differs from the method of FIG. 3, however, in that FIG. 5 further includes receiving (502), from the accelerator (194), a subsequent memory access instruction. Receiving (502), from the accelerator (194), a subsequent memory access instruction may be carried out by receiving a subsequent memory access instruction comprising an XTAG. The XTAG may be translated into a real address using the XTAG table.

The method of FIG. 5 further includes determining (504), using base address registers on the adapter (192), that the subsequent memory access instruction does not target the LPC memory. Determining (504), using base address registers on the adapter (192), that the subsequent memory access instruction does not target the LPC memory may be carried out by determining a base address for the real address and using the combined base address and real address to determine that the subsequent memory access request targets a memory location not on the memory attached to the adapter (192).

The method of FIG. 5 further includes sending (506), by the adapter (192), the subsequent memory access instruction and the real address for the subsequent memory access instruction (328) to the processor (156). Sending (506), by the adapter (192), the subsequent memory access instruction and the real address for the subsequent memory access instruction (328) to the processor (156) may be carried out by receiving, by the processer, the subsequent memory access instruction (328) and determining whether the targeted memory location is on the processor or another adapter on the system (e.g., using a base address register). If the targeted memory is processor memory, the processor services the subsequent memory access request. If the targeted memory is attached to another adapter, then the subsequent memory access request may be forwarded to the adapter managing that memory.

Figure 6:
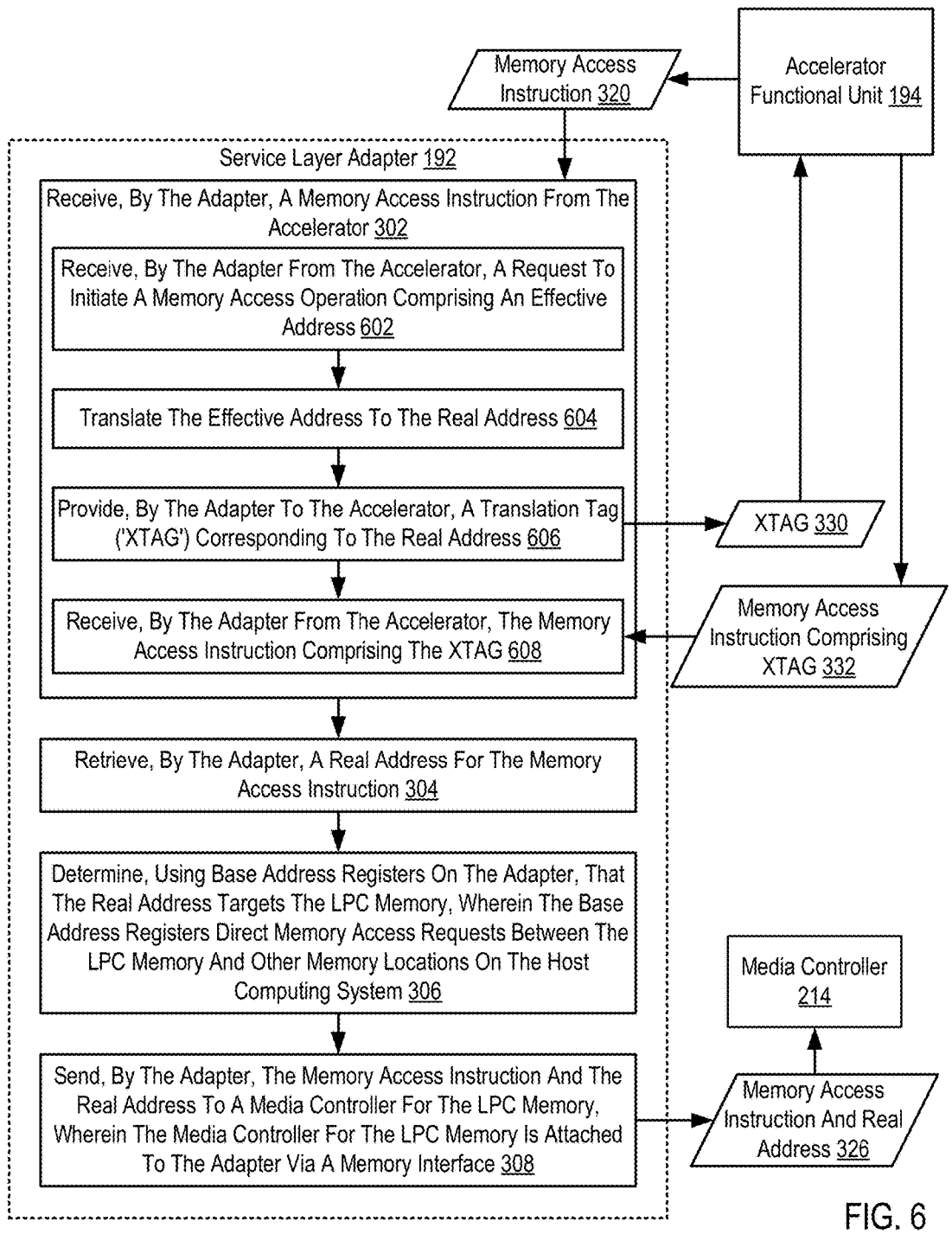
FIG. 6 sets forth a flow chart illustrating an exemplary method for managing LPC memory using a service layer adapter according to embodiments of the present invention.

For further explanation, FIG. 6 sets forth a flow chart illustrating an exemplary method for managing lowest point of coherency (LPC) memory using a service layer adapter according to embodiments of the present invention that includes receiving (302), by the adapter (192), a memory access instruction (320) from the accelerator (194); retrieving (304), by the adapter (192), a real address for the memory access instruction; determining (306), using base address registers on the adapter (192), that the real address targets the LPC memory, wherein the base address registers direct memory access requests between the LPC memory and other memory locations on the host computing system; and sending (308), by the adapter (192), the memory access instruction and the real address (326) to a media controller (214) for the LPC memory, wherein the media controller (214) for the LPC memory is attached to the adapter (192) via a memory interface.

The method of FIG. 6 differs from the method of FIG. 3, however, in that receiving (302), by the adapter (192), a memory access instruction (320) from the accelerator (194) includes receiving (602), by the adapter (192) from the accelerator (194), a request to initiate a memory access operation comprising an effective address; translating (604) the effective address to the real address; providing (606), by the adapter (192) to the accelerator (194), a translation tag ('XTAG') (330) corresponding to the real address; and receiving (608), by the adapter (192) from the accelerator (194), the memory access instruction comprising the XTAG (332).

Receiving (602), by the adapter (192) from the accelerator (194), a request to initiate a memory access operation comprising an effective address may be carried out by the accelerator (194) transmitting the request to initiate a memory access operation to a coherency interface on the coherency service layer of the adapter (192). The request to initiate a memory access operation may include a location identifier, a process handle, and the operation identifier. The location identifier is an address that the accelerator uses to refer to a memory location on the processor, RAM, or other hardware element on the computing system. The location identifier may be, for example, an effective address. The process handle is an identifier of the context for the request. The context is used by the adapter (192) to translate the location identifier into a real address understood by the target device. The operation identifier may identify the type of operation the AFU (194) is initiating, such as a memory access instruction.

Translating (604) the effective address to the real address may be carried out by using the ERAT on the adapter to convert the effective address to a real address. Providing (606), by the adapter (192) to the accelerator (194), a translation tag ('XTAG') (330) corresponding to the real address may be carried out by determining, by the adapter (192), the real address for the memory access instruction and storing the real address in an XTAG table on the adapter (192).

Receiving (608), by the adapter (192) from the accelerator (194), the memory access instruction comprising the XTAG (332) may be carried out by the accelerator (194) transmitting the memory access instruction comprising the XTAG (332) to the adapter (192) via the coherency interface or another specialized interface, such as a direct memory access interface.

In view of the explanations set forth above, readers will recognize that the benefits of managing lowest point of coherency (LPC) memory using a service layer adapter according to embodiments of the present invention include:
  Improving the operation of a computer system by providing an open processor memory interface to an AFU independent of the coherent interface, increasing storage access efficiency.
  Improving the operation of a computer system by providing, to AFUs, protected access to LPC memory attached to the adapter, reducing latency.
  Improving the operation of a computer system by managing memory access by AFUs to memory local to the adapter and remote to the adapter, increasing memory integrity.

Exemplary embodiments of the present invention are described largely in the context of a fully functional computer system for managing lowest point of coherency (LPC) memory using a service layer adapter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing lowest point of coherency (LPC) memory using a service layer adapter, the adapter coupled to a processor and an accelerator on a host computing system, the processor configured for symmetric multi-processing, the method comprising:
    receiving, by the adapter, a memory access instruction from the accelerator;
    retrieving, by the adapter, a real address for the memory access instruction;
    determining, using base address registers on the adapter, whether the real address targets the LPC memory or other memory locations on the host computing system, wherein the base address registers direct memory access requests between the LPC memory and other memory locations on the host computing system; and
    sending, by the adapter, in response to the memory access instruction targeting the LPC memory, the memory access instruction and the real address to a media controller for the LPC memory, wherein the media controller for the LPC memory is attached to the adapter via a memory interface.

2. The method of claim 1, further comprising:
    receiving, from the processor, a subsequent memory access instruction;
    determining, using base address registers on the adapter, that the subsequent memory access instruction targets the LPC memory; and
    sending, by the adapter, the subsequent memory access instruction and the real address for the subsequent memory access instruction to the media controller for the LPC memory.

3. The method of claim 1, further comprising:
    receiving, from the accelerator, a subsequent memory access instruction;
    determining, using base address registers on the adapter, that the subsequent memory access instruction targets the LPC memory or the other memory locations on the host computing system; and
    sending, by the adapter, in response to the subsequent memory access instruction targeting the other memory locations on the host computing system, the subsequent memory access instruction and the real address for the subsequent memory access instruction to the processor.

4. The method of claim 1, wherein receiving, from the accelerator, a memory access instruction targeting the LPC memory comprises:
    receiving, by the adapter from the accelerator, a request to initiate a memory access operation comprising an effective address;
    translating the effective address to the real address;
    providing, by the adapter to the accelerator, a translation tag ('XTAG') corresponding to the real address; and
    receiving, by the adapter from the accelerator, the memory access instruction comprising the XTAG.

5. The method of claim 1, wherein the other memory locations comprise processor memory and memory coupled to additional adapters on the host computing system.

6. The method of claim 1, wherein the LPC memory is partitioned between the accelerator and the processor.

7. The method of claim 1, wherein the memory access instruction is received by the adapter via a coherency interface on the adapter.

8. An adapter for managing lowest point of coherency (LPC) memory using a service layer adapter, the adapter coupled to a processor and an accelerator on a host computing system, the processor configured for symmetric multi-processing, the adapter configured to carry out the steps of:
receiving, by the adapter, a memory access instruction from the accelerator;
retrieving, by the adapter, a real address for the memory access instruction;
determining, using base address registers on the adapter, whether the real address targets the LPC memory or other memory locations on the host computing system, wherein the base address registers direct memory access requests between the LPC memory and other memory locations on the host computing system; and
sending, by the adapter, in response to the memory access instruction targeting the LPC memory, the memory access instruction and the real address to a media controller for the LPC memory, wherein the media controller for the LPC memory is attached to the adapter via a memory interface.

9. The adapter of claim 8, the steps further comprising:
receiving, from the processor, a subsequent memory access instruction;
determining, using base address registers on the adapter, that the subsequent memory access instruction targets the LPC memory or the other memory locations on the host computing system; and
sending, by the adapter, in response to the subsequent memory access instruction targeting the other memory locations on the host computing system, the subsequent memory access instruction and the real address for the subsequent memory access instruction to the processor.

10. The adapter of claim 8, the steps further comprising:
receiving, from the accelerator, a subsequent memory access instruction;
determining, using base address registers on the adapter, that the subsequent memory access instruction does not target the LPC memory; and
sending, by the adapter, the subsequent memory access instruction and the real address for the subsequent memory access instruction to the processor.

11. The adapter of claim 8, wherein receiving, from the accelerator, a memory access instruction targeting the LPC memory comprises:
receiving, by the adapter from the accelerator, a request to initiate a memory access operation comprising an effective address;
translating the effective address to the real address;
providing, by the adapter to the accelerator, a translation tag ('XTAG') corresponding to the real address; and
receiving, by the adapter from the accelerator, the memory access instruction comprising the XTAG.

12. The adapter of claim 8, wherein the other memory locations comprise processor memory and memory coupled to additional adapters on the host computing system.

13. The adapter of claim 8, wherein the LPC memory is partitioned between the accelerator and the processor.

14. The adapter of claim 8, wherein the memory access instruction is received by the adapter via a coherency interface on the adapter.

15. A computer program product for managing lowest point of coherency (LPC) memory using a service layer adapter, the adapter coupled to a processor and an accelerator on a host computing system, the processor configured for symmetric multi-processing, the computer program product disposed upon a non-transitory computer readable medium, the computer program product comprising computer program instructions that, when executed, cause the adapter to carry out the steps of:
receiving, by the adapter, a memory access instruction from the accelerator;
retrieving, by the adapter, a real address for the memory access instruction;
determining, using base address registers on the adapter, whether the real address targets the LPC memory or other memory locations on the host computing system, wherein the base address registers direct memory access requests between the LPC memory and other memory locations on the host computing system; and
sending, by the adapter, in response to the memory access instruction targeting the LPC memory, the memory access instruction and the real address to a media controller for the LPC memory, wherein the media controller for the LPC memory is attached to the adapter via a memory interface.

16. The computer program product of claim 15, the steps further comprising:
receiving, from the processor, a subsequent memory access instruction;
determining, using base address registers on the adapter, that the subsequent memory access instruction targets the LPC memory or the other memory locations on the host computing system; and
sending, by the adapter, in response to the subsequent memory access instruction targeting the other memory locations on the host computing system, the subsequent memory access instruction and the real address for the subsequent memory access instruction to the processor.

17. The computer program product of claim 15, the steps further comprising:
receiving, from the accelerator, a subsequent memory access instruction;
determining, using base address registers on the adapter, that the subsequent memory access instruction does not target the LPC memory; and
sending, by the adapter, the subsequent memory access instruction and the real address for the subsequent memory access instruction to the processor.

18. The computer program product of claim 15, wherein receiving, from the accelerator, a memory access instruction targeting the LPC memory comprises:
receiving, by the adapter from the accelerator, a request to initiate a memory access operation comprising an effective address;
translating the effective address to the real address;
providing, by the adapter to the accelerator, a translation tag ('XTAG') corresponding to the real address; and
receiving, by the adapter from the accelerator, the memory access instruction comprising the XTAG.

19. The computer program product of claim 15, wherein the other memory locations comprise processor memory and memory coupled to additional adapters on the host computing system.

20. The computer program product of claim 15, wherein the LPC memory is partitioned between the accelerator and the processor.

* * * * *